(12) United States Patent
Zhang et al.

(10) Patent No.: US 6,370,044 B1
(45) Date of Patent: Apr. 9, 2002

(54) SYNCHRONOUS RECTIFIER CIRCUIT

(75) Inventors: Alpha J. Zhang; Guisong Huang; Yilei Gu, all of Neihu Taipei (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/855,006

(22) Filed: May 14, 2001

(30) Foreign Application Priority Data

Nov. 30, 2000 (TW) ........................................ 89125522 A (51) Int. Cl.[7] .............................................. H02M 3/335
(52) U.S. Cl. ...................................... 363/21.06; 363/89
(58) Field of Search ................ 363/89, 21.06, 363/127

(56) References Cited

U.S. PATENT DOCUMENTS 5,663,877 A * 9/1997 Dittli et al. ................. 363/127
6,026,005 A    2/2000 Abdoulin
6,169,675 B1 * 1/2001 Shimamori et al. ......... 363/127
6,304,463 B1 * 10/2001 Krugly ..................... 363/21.04

* cited by examiner

*Primary Examiner*—Shawn Riley
(74) *Attorney, Agent, or Firm*—Alston & Bird LLP

(57) ABSTRACT

A self-driven synchronous rectifier circuit applied to a forward converter is provided. The circuit includes a transformer having a primary winding and a secondary winding for converting an input voltage into an output voltage, a first synchronous rectifier switch and a second synchronous rectifier switch connected to the secondary winding for rectifying the output voltage; and an auxiliary switch, wherein the gate terminal thereof is connected to the gate terminal of the first synchronous rectifier switch and the positive end of the secondary winding, the source terminal thereof is connected to the drain terminal of the first synchronous rectifier switch and the negative end of the secondary winding, and the drain terminal thereof is connected to the gate terminal of the second synchronous rectifier switch.

19 Claims, 9 Drawing Sheets

Fig. 10

SYNCHRONOUS RECTIFIER CIRCUIT

FIELD OF THE INVENTION

The present invention relates to a synchronous rectifier circuit, and more particularly to a self-driven synchronous rectifier circuit.

BACKGROUND OF THE INVENTION

Synchronous rectification is widely applied in a low voltage and high current DC-to-DC converter. Because the on-state voltage drop of a low voltage power MOSFET transistor is much lower than that of a diode, power MOSFET is used as synchronous switch to improve the overall conversion efficiency. As it is known in the art, in the customarily used forward DC-to-DC converter, the MOSFET synchronous switch is driven by the secondary windings of a transformer because the self-driven technique has inherent simplicity. Meanwhile, the duty ratio is so small that the continuous conduction of the MOSFET switch would not be effectively conducted. In such condition, the load current will be diverted through the body diode of the MOSFET switch, which causes additional loss and thus reduces the overall conversion efficiency. In order to solve the above drawbacks, a phase-lock loop circuit was developed by International Rectifier (U.S. Pat. No. 6,026,005). The application of the phase-lock circuit is restricted because a specific gate-driving chip and the corresponding peripheral circuit are required, which results in high cost.

Figure 1A:
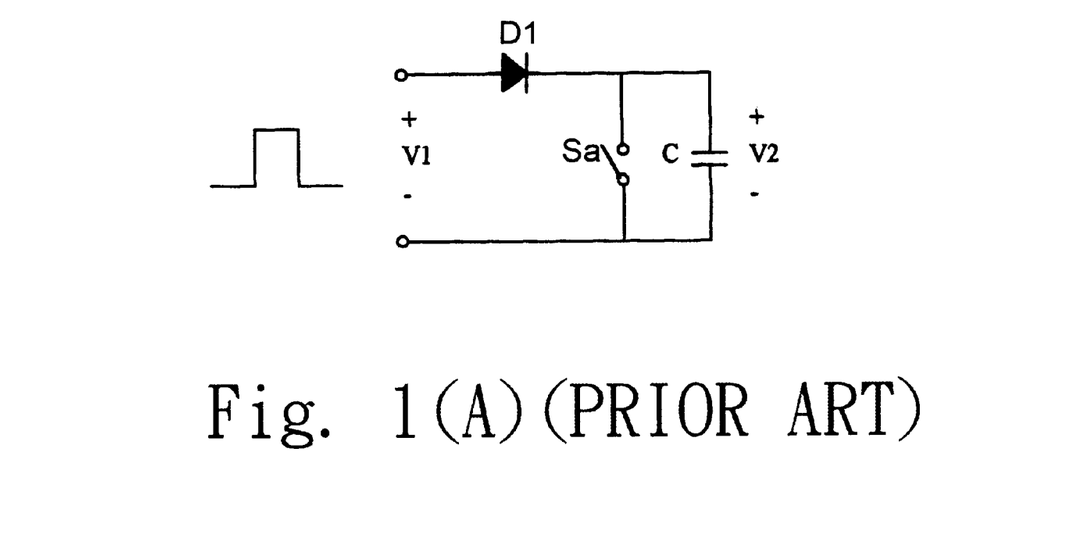
FIG. 1(A) is a simplified equivalent circuit of a secondary-winding self-driving synchronous rectifier circuit according to prior art.
Figure 1B:
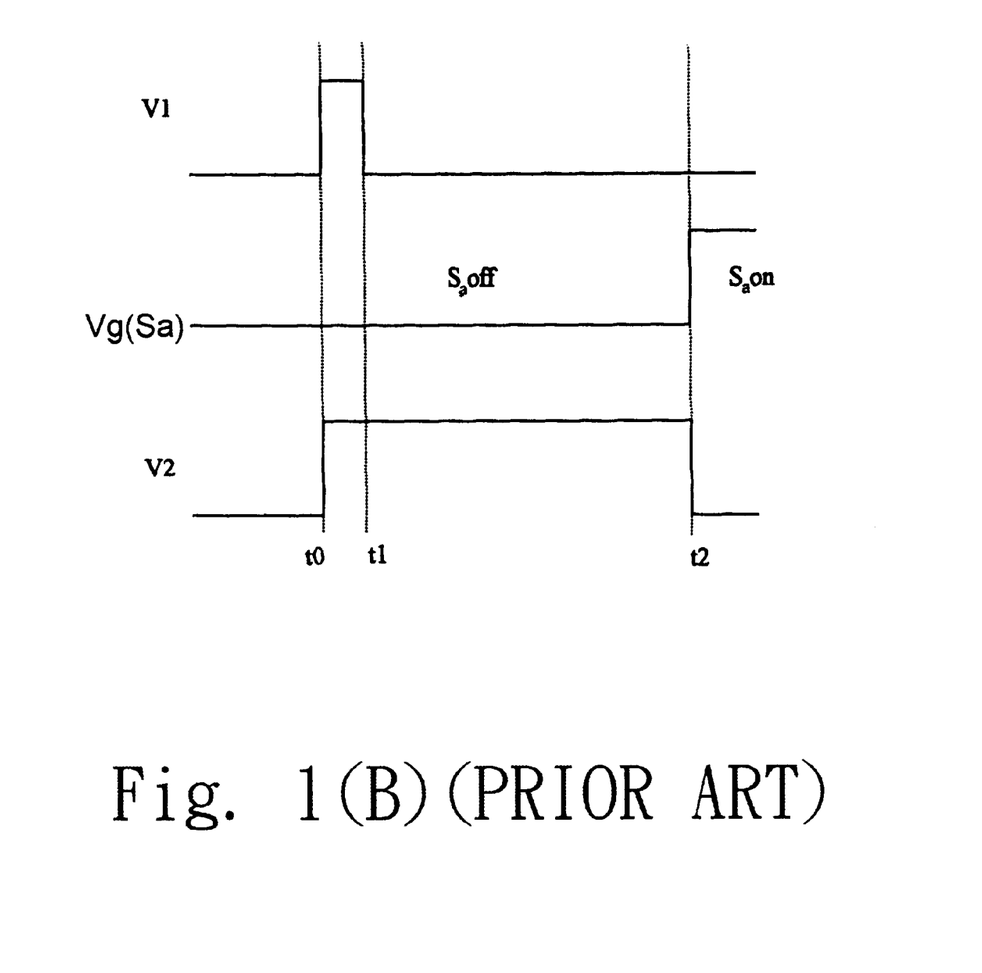
FIG. 1(B) is a timing diagram of waveform in the circuit of FIG. 1(A)

Recently, a secondary-winding self-driving synchronous rectifier circuit is developed. FIG. 1(A) is a simplified equivalent circuit illustrating the self-driving circuit according to the prior art. Referring to FIG. 1(A), the capacitor C is a gate parasitic capacitance of a MOSFET switch, the switch Sa is an auxiliary MOSFET switch, and V1 is a driving signal. FIG. 1(B) is a timing diagram of waveforms in the circuit of FIG. 1(A). Please refer to FIG. 1(B). Before t=t0, the switch Sa is turned off and the initial voltage of the capacitor C is zero. At t=t0, the input signal V1 is positive, and the positive current passes through the diode D1 for charging the capacitor C to an amplitude of V1. At t=t1, the input signal is zero and the diode D1 is biased off. The electric charges stored in the capacitor C is maintained at a voltage V2. At t=t2, the switch Sa is turned on; therefore, the electric charges in the capacitor C discharges through the switch Sa such that the voltage V2 decreases to zero. It will be found that although the driving signal V1 is disappeared from t=t1 to t=t2, the synchronous rectifier MOSFET switch still keep conducting.

Figure 2A:
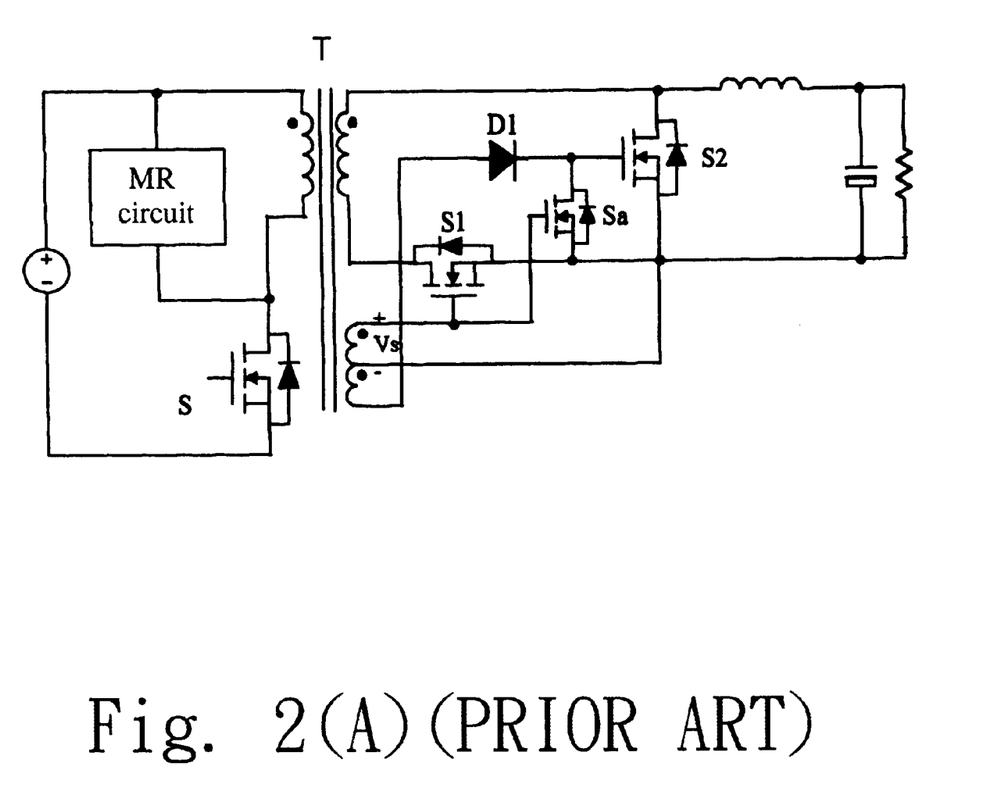
FIG. 2(A) is a detailed circuit diagram of the self-driven synchronousrectifier circuit in FIG. 1(A)
Figure 2B:
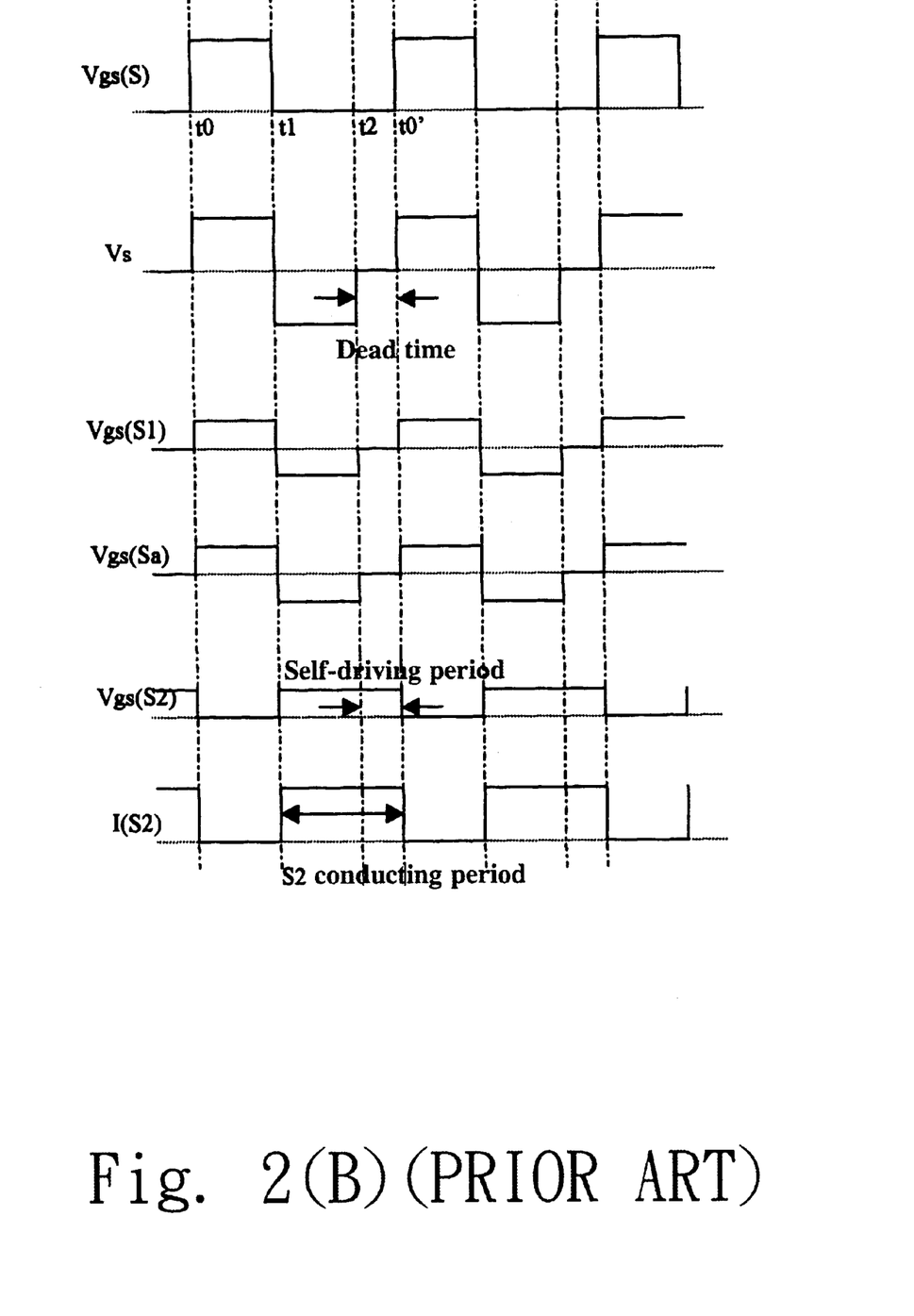
FIG. 2(B) is a timing diagram of waveform in the circuit of FIG. 2(A)

FIGS. 2(A) and 2(B) are respectively circuit diagram and timing waveform diagram of the self-driven synchronous rectifier for a forward DC-to-DC converter according to the prior art. The switch S is a main switch of a forward converter, the switches S1 and S2 are synchronous rectifier MOSFET switches and the switch Sa is an auxiliary MOSFET switch. The self-driving function for the gate of the MOSFET switch S2 is performed by employing the auxiliary MOSFET switch Sa and the diode D1. The operation process will be described as follows.

From t=t0 to t=t1, the main switch S is turned on. The voltage of the secondary winding is positively applied on the synchronous rectifier MOSFET switch S1 and the auxiliary MOSFET switch Sa such that the MOSFET switch S1 and the auxiliary MOSFET switch Sa are conducted. The conduction of the switch Sa causes the switch S2 to be shorted and turned off. Therefore, the output current passes through the MOSFET switch S1.

At t=t1, the main switch S is turned off and the magnetizing current flows towards the magnetic reset (MR) circuit. The synchronous rectifier MOSFET switch S1 and the auxiliary MOSFET switch Sa are biased off. The voltage on the secondary winding of the transformer T passes through the diode D1 and charges to the gate of the MOSFET switch S2. Therefore, the output current passes through the MOSFET switch S2.

At t=t2, the reset of the transform T is finished. The voltage on the secondary winding changes to zero and the switch Sa is still off. Since the diode D1 is biased off, the electric charges in the MOSFET switch S2 maintains constant and thus the MOSFET switch S2 continuously conducts.

At t=t0', the voltage on the secondary winding of the transformer T changes to a positive value. The MOSFET switch Sa is turned on to discharge the gate capacitance of the MOSFET switch S2 and allow the switch S2 to be turned off. Therefore, the MOSFET switch S1 is turned on because of the positive voltage on the secondary winding.

Then, a new switching cycle is repeated.

A main problem occurs at the time when the MOSFET switch S2 is being turned off. When the voltage on the secondary winding of the transformer T changes from a negative value to a positive value, the MOSFET switch S1 and the MOSFET switch Sa are simultaneously conducted, while the switch S2 is turned off until its gate is discharged to a voltage below a turn-on threshold voltage. That is to say, the turn-off of the switch S2 lags behind the turn-on of the switch S1. Therefore, a cross conducting period exists between the switch S1 and the switch S2, which increases the conductive loss.

Therefore, the present invention provides a self-driven synchronous rectifier circuit for overcoming the problems described above.

SUMMARY OF THE INVENTION

It is an object of the present invention to provide a self-driven synchronous rectifier circuit to reduce the simultaneous conduction described above.

It is another object of the present invention to provide a self-driven synchronous rectifier circuit with simplicity.

It is another object of the present invention to provide a self-driven synchronous rectifier circuit for increasing the stability and reliability of the driving circuit.

In accordance with an aspect of the present invention, there is provided a self-driven synchronous rectifier circuit applied to a forward converter. The circuit includes a transformer, a first synchronous rectifier switch, a second synchronous rectifier switch and an auxiliary switch. The transformer has a primary winding and a secondary winding for converting an input voltage into an output voltage, wherein the secondary winding further includes a driving winding having a center tap. The first synchronous rectifier switch and the second synchronous rectifier switch are connected to the secondary winding for rectifying the output voltage. The gate terminal of the auxiliary switch is connected to the gate terminal of the first synchronous rectifier switch and the positive end of the driving winding, the source terminal thereof is connected to the drain terminal of the first synchronous rectifier switch and the negative end of the driving winding, and the drain terminal thereof is connected to the gate terminal of the second synchronous rectifier switch.

Preferably, each of the first synchronous rectifier switch, the second synchronous rectifier switch and the auxiliary switch is MOSFET switch.

Preferably, the circuit further includes a saturated inductor connected to the secondary winding.

Preferably, the positive end of the driving winding and the positive end of the primary winding have the same polarities.

Preferably, the forward converter further includes a dual switch forward converter.

In accordance with another aspect of the present invention, there is provided a self-driven synchronous rectifier circuit applied to a forward converter. The self-driven synchronous rectifier circuit includes a transformer having a primary winding and a secondary winding for converting an input voltage into an output voltage, a first synchronous rectifier switch and a second synchronous rectifier switch connected to the secondary winding for rectifying the output voltage and an auxiliary switch, wherein the gate terminal thereof is connected to the gate terminal of the first synchronous rectifier switch and the positive end of the secondary winding, the source terminal thereof is connected to the drain terminal of the first synchronous rectifier switch and the negative end of the secondary winding, and the drain terminal thereof is connected to the gate terminal of the second synchronous rectifier switch.

Preferably, each of the first synchronous rectifier switch, the second synchronous rectifier switch and the auxiliary switch is MOSFET switch.

Preferably, the circuit further includes a saturated inductor connected to the secondary winding.

Preferably, the secondary winding further includes a driving winding having a center tap.

Preferably, the positive end of the driving winding and the positive end of the primary winding have the same polarities.

Preferably, the gate terminal of the auxiliary switch is connected to the gate terminal of the first synchronous rectifier switch and the positive end of the driving winding.

Preferably, the source terminal of the auxiliary switch is connected to the negative end of the driving winding.

Preferably, a source end of said second synchronous rectifier switch is connected to the center tap of the driving winding.

Preferably, the forward converter further includes a dual switch forward converter.

In accordance with another aspect of the present invention, there is provided a self-driven synchronous rectifier circuit. The self-driven synchronous rectifier circuit includes a transformer, a first synchronous rectifier switch and a second synchronous rectifier switch and an auxiliary switch. The transformer has a primary winding and a secondary winding for converting an input voltage into an output voltage wherein the secondary winding further includes a driving winding having a center tap. The first synchronous rectifier switch and a second synchronous rectifier switch are connected to the secondary winding for rectifying the output voltage. The auxiliary switch has a gate terminal connected to the gate terminal of the first synchronous rectifier switch and the positive end of the driving winding, a source terminal connected to the negative end of the driving winding and a drain terminal connected to the gate terminal of the second synchronous rectifier switch. When a reset of the transform is finished, voltage across the second synchronous rectifier is kept substantially constant and the second synchronous rectifier continuously conducts, thereby reducing simultaneous conduction of the first synchronous rectifier switch and the second synchronous rectifier switch.

Preferably, each of the first synchronous rectifier switch, the second synchronous rectifier switch and the auxiliary switch is MOSFET switch.

Preferably, the circuit further includes a saturated inductor connected to the secondary winding.

Preferably, the positive end of the driving winding and the positive end of the primary winding have the same polarities.

Preferably, the forward converter further includes a dual switch forward converter.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 3A:
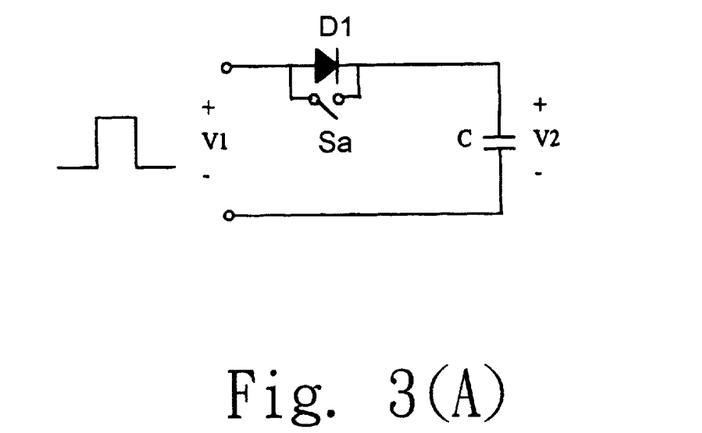
FIG. 3(A) is a simplified equivalent circuit of a self-driven synchronous rectifier circuit according to the present invention.
Figure 3B:
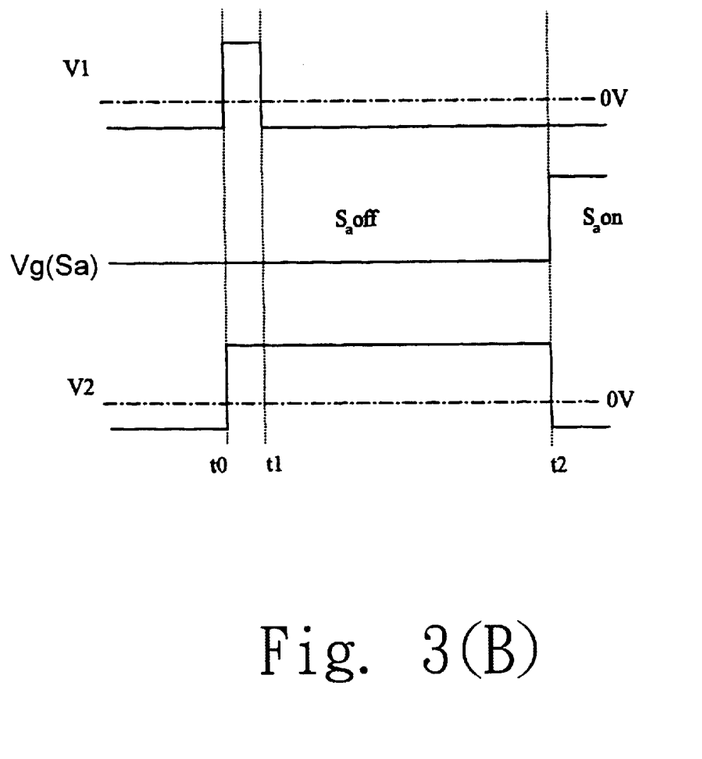
FIG. 3(B) is a timing diagram of waveform in the circuit of FIG. 3(A)

FIGS. 3A and 3B are respectively simplified equivalent circuit and timing waveform diagram of a self-driven synchronous rectifier circuit according to the present invention. The operation principle will be described as follows.

Before t=t0, the switch Sa is turned off and the initial voltage of the capacitor C is at the low level voltage of V1. At t=t0, the input signal V1 changes to its high level voltage and positively passes through the diode D1 for charging to the capacitor C to reach the high level voltage of V1. At t=t1, the input signal V1 changes to a low level voltage and the diode D1 is biased off. The electric charges stored in the capacitor C maintains unchanged at the voltage V2. At t=t2, the switch Sa is turned on to discharge the electric charges stored in the capacitor C and thus the voltage of V2 decreases to the low level voltage of V1. Provided that the capacitor C is a gate parasitic capacitance of a synchronous rectifier switch, the switch Sa is an auxiliary MOSFET switch and V1 is a driving signal, it could be seen from FIG. 3(B) that the synchronous rectifier MOSFET switches is kept conducting even though the driving signal disappears during the period from t=t1 to t=t2. If the low level voltage of V1 is negative, the period for turning off the MOSFET switch would be accelerated, which reduces or avoid the problem related to simultaneous conduction of the rectifying switches.

Figure 4A:
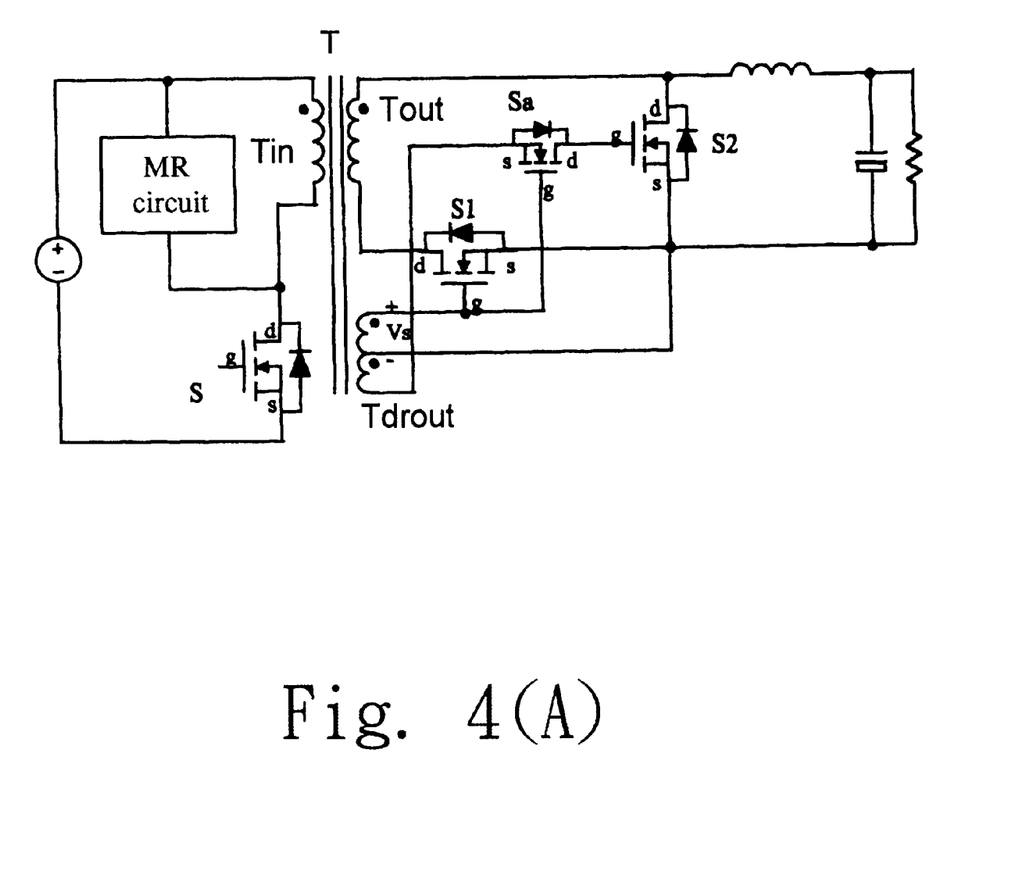
FIG. 4(A) shows the self-driven synchronous rectifier circuit applied to a forward converter according to the first embodiment of the present invention.
Figure 4B:
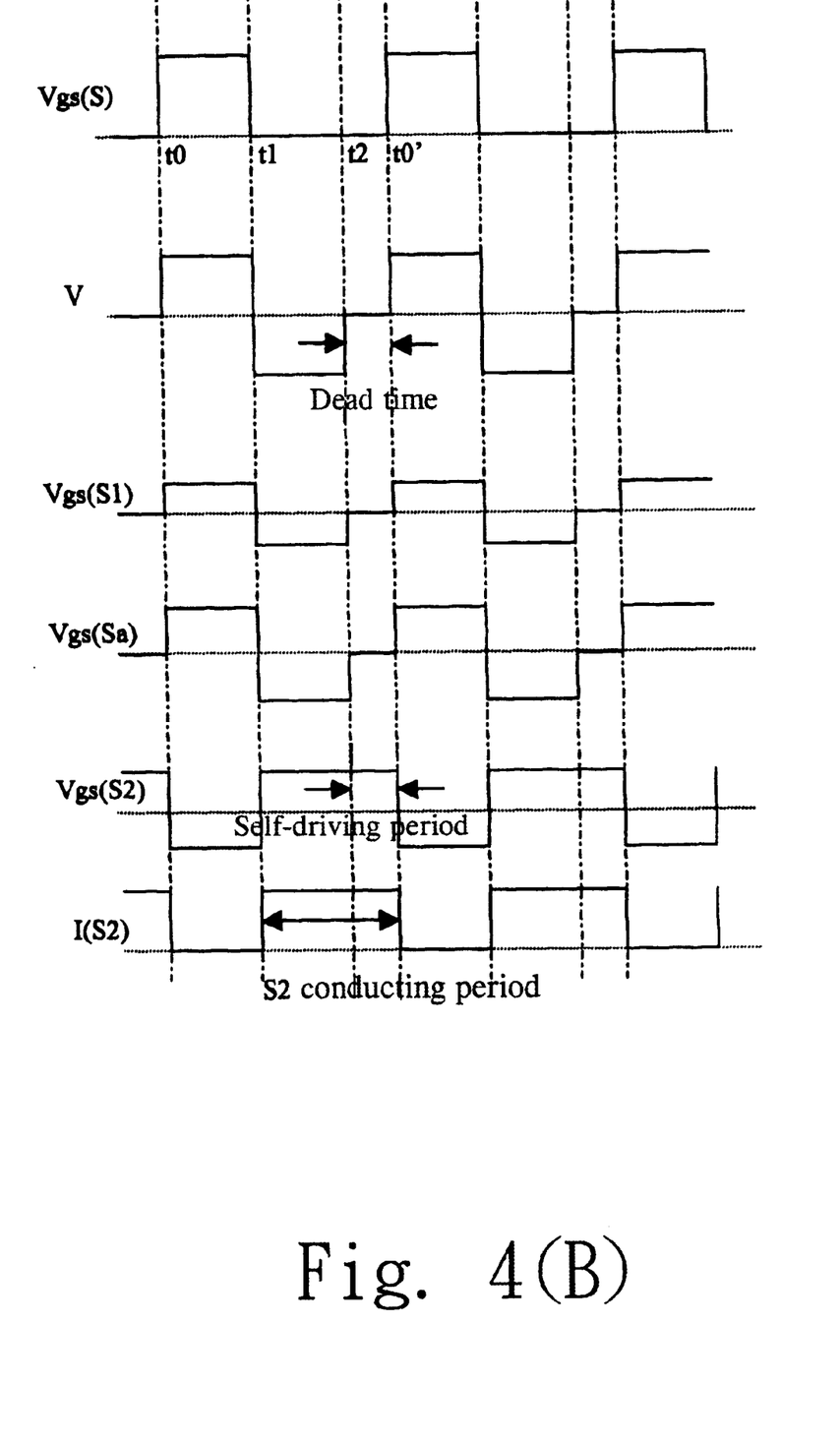
FIG. 4(B) is a timing diagram of waveform in the circuit of FIG. 4(A)

FIG. 4(A) shows the self-driven synchronous rectifier circuit applied to a forward converter according to the first embodiment of the present invention. FIG. 4(B) is a timing diagram of waveform in the circuit of FIG. 4(A). Referring to FIG. 4(A), the transformer T includes a primary winding Tin, a secondary winding Tout and a driving winding Tdrout, wherein the driving winding Tdrout includes a center tap. The primary winding Tin has a positive end connected to the positive terminal of the power source and a negative end connected to the drain terminal of a main switch S. The source terminal of the main switch S is connected to the negative terminal of the power source. The positive ends of the secondary winding Tout and the driving winding Tdrout have the same polarities as the positive end of the primary winding. The switches S1 and S2 are synchronous rectifier MOSFET transistors. The source terminals of the both transistors are connected with each other and connected to the center tap of the driving winding Tdrout. The drain terminal of the MOSFET switch S1 is connected to the negative end of the driving winding Tdrout, while the gate terminal of the MOSFET switch S1 is connected to the positive end of the driving winding Tdrout. The drain terminal of the MOSFET switch S2 is connected to the positive end of the secondary winding Tout, while the gate terminal of the MOSFET switch S2 is connected to the drain terminal of the auxiliaryant MOSFET switch Sa. The source terminal of the auxiliary MOSFET switch Sa is connected to the negative end of the driving winding Tdrout, while the gate terminal of the auxiliary MOSFET switch Sa is connected to the positive end of the driving winding Tdrout. The operation principle will be described as follows.

From t=t0 to t=t1, the main switch S is turned on. The voltage on the driving winding Tdrout is positively applied on the gate terminals of the MOSFET switch S1 and the auxiliary MOSFET switch Sa, and both switches are turned on. The conduction of the auxiliary MOSFET switch Sa causes the connection of the gate terminal of the MOSFET switch S2 with the negative end of the driving winding Tdrout. The reverse voltage is applied on the gate terminal of the MOSFET switch S2 and thus the MOSFET switch S2 is turned off. Therefore, the output current passes through the MOSFET switch S1.

At t=t1, the main switch S is turned off, and thus the magnetizing current passes through the magnetic reset (MR) circuit. The voltages applied on the gate terminal of the MOSFET switch S1 and the auxiliary MOSFET switch Sa are in reverse direction, and the MOSFET switch S1 and the auxiliary MOSFET switch Sa are turned off. The voltage on negative end of the driving winding Tdrout changes to a positive value, which passes through the body diode of the auxiliary MOSFET switch Sa for charging to the gate terminal of the MOSFET switch S2. Therefore, the output current passes through the MOSFET switch S2.

At t=t2, the reset of the transform T is finished. The voltage of the driving winding Tdrout changes to zero and the auxiliary MOSFET switch Sa is turned off. Because the body diode of the switch Sa is biased off, the gate electric charge in the MOSFET switch S2 maintains constant and thus the switch S2 continuously conducts.

At t=t0', the main switch S is turned on. The voltage of the driving winding Tdrout is positively applied on the MOSFET switch S1 and the auxiliary MOSFET switch Sa for the conduction thereof. The conduction of the auxiliary MOSFET switch Sa allows the negative voltage of the driving winding Tdrout to apply on the gate terminal of the MOSFET switch S2 for turning the MOSFET switch S2 off. Then, a new switching cycle is repeated.

Since there is a negative voltage applied on the gate terminal of the MOSFET switch S2, the MOSFET switch S2 is turned off more rapidly and thus the simultaneous conducting period between the MOSFET switch S1 and the MOSFET switch S2 is reduced. Furthermore, the negative voltage applied on the gate terminal of the MOSFET switch S2 could largely prevent the MOSFET switch S2 from being interfered, thereby increasing the stability and reliability of the driving circuit.

Figure 5:
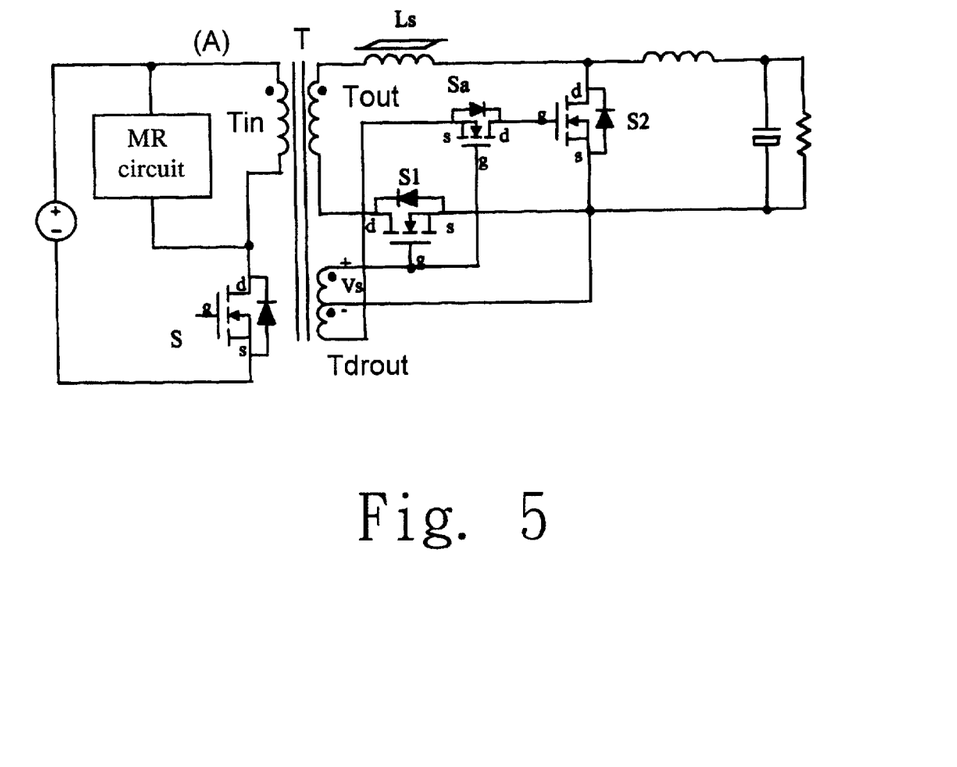
FIG. 5 shows the self-driven synchronous rectifier circuit applied to a forward converter according to the second embodiment of the present invention.

Because the shutoff of the MOSFET switch S2 has a delay period, a smaller simultaneous conducting period may exist between the MOSFET switch S1 and the MOSFET switch S2. FIG. 5 shows the self-driven synchronous rectifier circuit applied to a forward converter according to the second embodiment of the present invention. In order to avoid the additional loss resulted from the simultaneous conduction of the MOSFET switch S1 and the MOSFET switch S2, a saturated inductor Ls could be connected to the secondary winding Tout in series in accordance with the present invention, as can be seen in FIG. 5. The saturated inductor Ls facilitates limiting the current peak generated from the simultaneous conduction, thereby reducing the loss of conduction.

Figure 6:
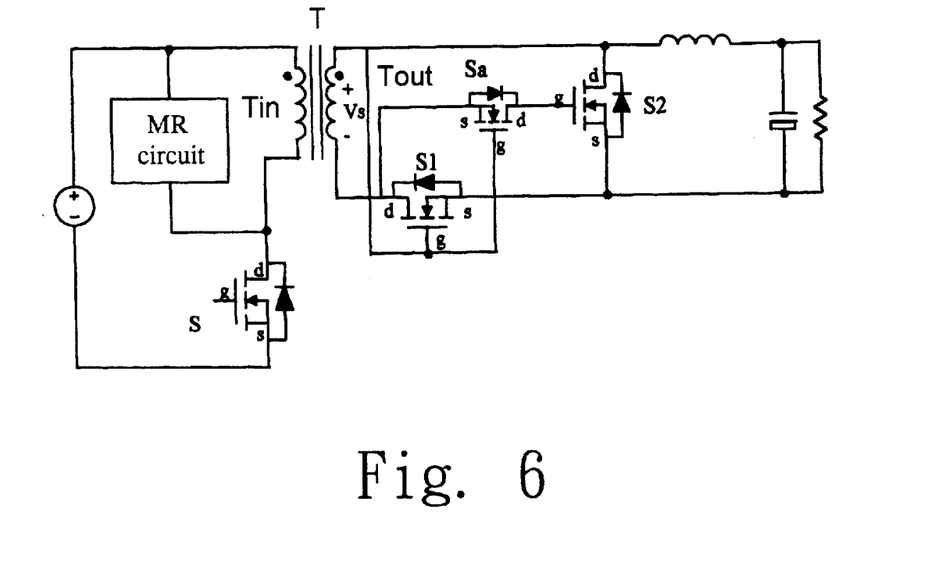
FIG. 6 shows the self-driven synchronous rectifier circuit applied to a forward converter according to the third embodiment of the present invention.

FIG. 6 shows the self-driven synchronous rectifier circuit applied to a forward converter according to the third embodiment of the present invention. When the voltage on the secondary winding Tout of the transformer T is close to that of the MOSFET switching driving circuit, the output voltage of the secondary winding Tout can be employed to drive the MOSFET switch S1 and the MOSFET switch S2. Thus, the driving winding Tdrout could be omitted. In this embodiment, the gate terminal of the MOSFET switch S1 and the gate terminal of the auxiliary MOSFET switch Sa are connected to the positive end of the secondary winding Tout, and the source terminal of the auxiliary MOSFET switch Sa is connected to the negative end of the secondary winding Tout. The other circuit structure and the operation principle are the same as those in FIG. 4.

Figure 7:
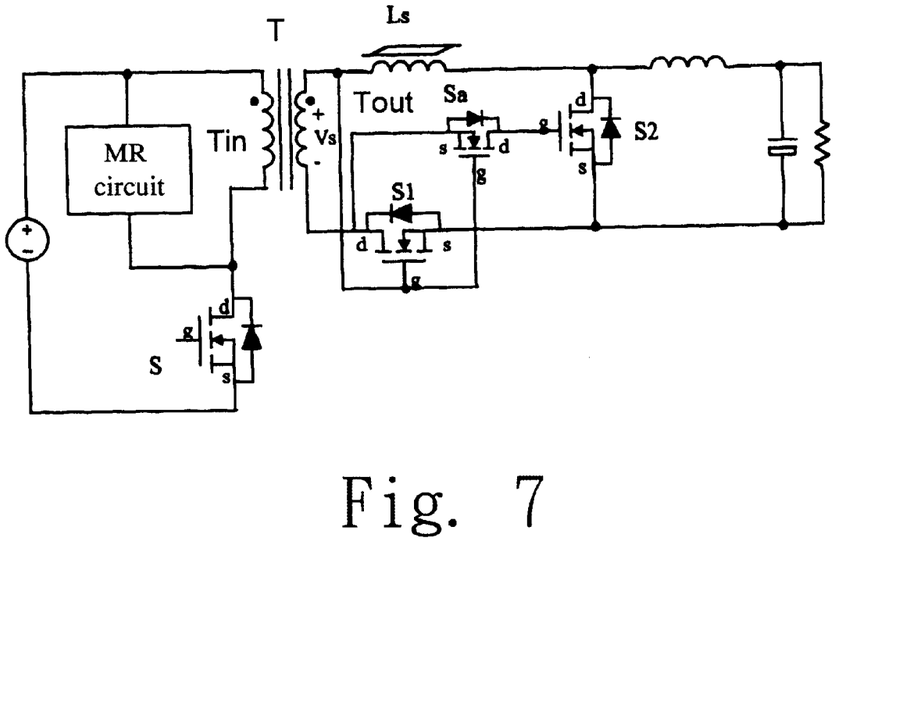
FIG. 7 shows the self-driven synchronous rectifier circuit applied to a forward converter according to the fourth embodiment of the present invention.

Similarly, the circuit in FIG. 6 can further include a saturated inductor Ls connected to the secondary winding of the transformer Tout, as can be seen in FIG. 7, for limiting the current peak generated from the simultaneous conduction.

Figure 8:
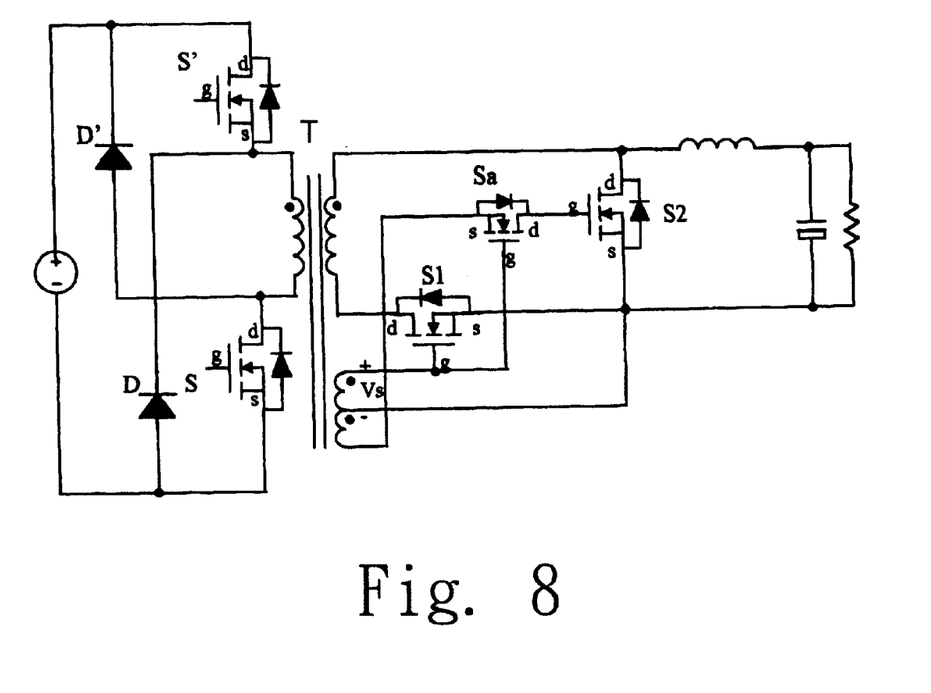
FIGS. 8–10 show the self-driven synchronous rectifier circuit applied to a dual switch forward converter according to the present invention.
Figure 9:
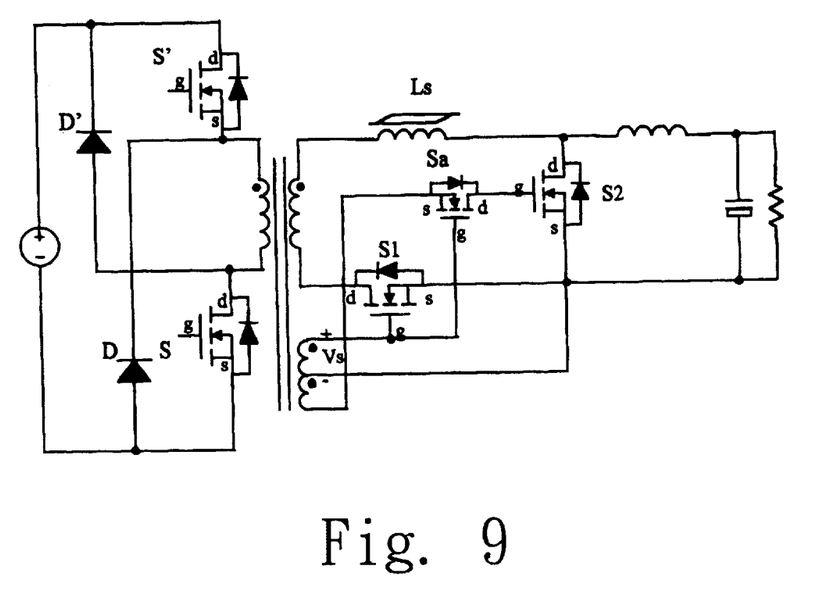
Figure 10:
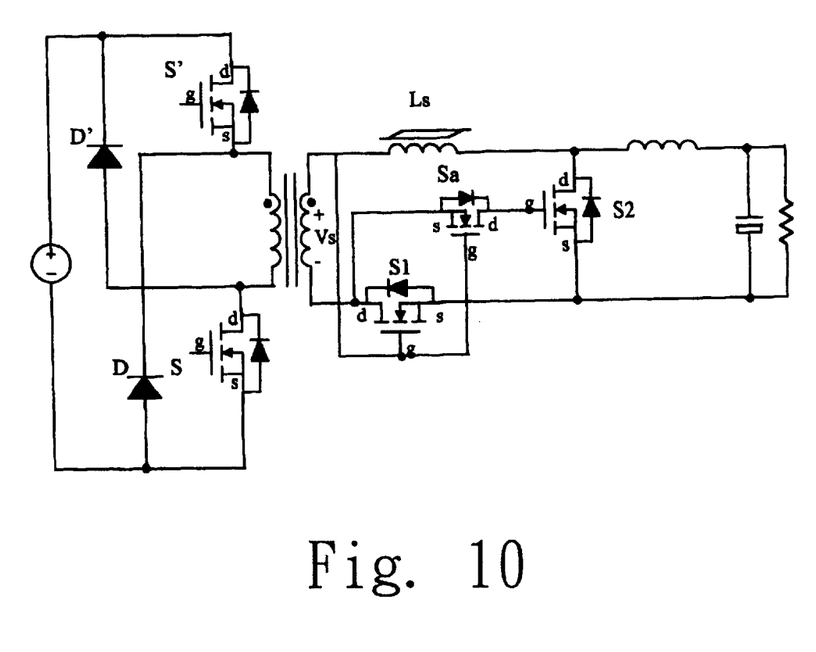

FIGS. 8–10 show another three self-driven synchronous rectifier circuits of the present invention applied to dual switch forward converters, which are corresponding to the circuits in FIG. 4, 5 and 7, respectively.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A self-driven synchronous rectifier circuit applied to a forward converter, comprising:
   a transformer having a primary winding and a secondary winding for converting an input voltage into an output voltage, wherein said secondary winding further comprises a driving winding having a center tap;
   a first synchronous rectifier switch and a second synchronous rectifier switch connected to said secondary winding for rectifying said output voltage; and
   an auxiliary switch, wherein the gate terminal thereof is connected to the gate terminal of said first synchronous rectifier switch and the positive end of said driving winding, the source terminal thereof is connected to the negative end of said driving winding, and the drain terminal thereof is connected to the gate terminal of said second synchronous rectifier switch.

2. The circuit according to claim 1, wherein each of said first synchronous rectifier switch, said second synchronous rectifier switch and said auxiliary switch is MOSFET switch.

3. The circuit according to claim 1, further comprising a saturated inductor connected to said secondary winding.

4. The circuit according to claim 1, wherein the positive end of said driving winding and the positive end of said primary winding have the same polarities.

5. The circuit according to claim 1, wherein said forward converter further comprises a dual switch forward converter.

6. A self-driven synchronous rectifier circuit, comprising:
   a transformer having a primary winding and a secondary winding for converting an input voltage into an output voltage;
   a first synchronous rectifier switch and a second synchronous rectifier switch connected to said secondary winding for rectifying said output voltage; and
   an auxiliary switch, wherein the gate terminal thereof is connected to the gate terminal of said first synchronous rectifier switch and the positive end of said secondary winding, the source terminal thereof is connected to the drain terminal of said first synchronous rectifier switch and the negative end of said secondary winding, and the drain terminal thereof is connected to the gate terminal of said second synchronous rectifier switch.

7. The circuit according to claim 6, wherein each of said first synchronous rectifier switch, said second synchronous rectifier switch and said auxiliary switch is MOSFET switch.

8. The circuit according to claim 6, further comprising a saturated inductor connected to said secondary winding.

9. The circuit according to claim 6, wherein said secondary winding further comprises a driving winding having a center tap.

10. The circuit according to claim 9, wherein the positive end of said driving winding and the positive end of said primary winding have the same polarities.

11. The circuit according to claim 10, wherein the gate terminal of said auxiliary switch is connected to the gate terminal of said first synchronous rectifier switch and the positive end of said driving winding.

12. The circuit according to claim 11, wherein the source terminal of said auxiliary switch is connected to the negative end of said driving winding.

13. The circuit according to claim 12, wherein the source end of said second synchronous rectifier switch is connected to said center tap of said driving winding.

14. The circuit according to claim 6, wherein said forward converter further comprises a dual switch forward converter.

15. A self-driven synchronous rectifier circuit, comprising:
   a transformer having a primary winding and a secondary winding for converting an input voltage into an output voltage, wherein said secondary winding further comprises a driving winding having a center tap;
   a first synchronous rectifier switch and a second synchronous rectifier switch connected to said secondary winding for rectifying said output voltage; and
   an auxiliary switch having a gate terminal connected to the gate terminal of said first synchronous rectifier switch and the positive end of said driving winding, a source terminal connected to the negative end of said driving winding and a drain terminal connected to the gate terminal of said second synchronous rectifier switch such that when a reset of said transform is finished, voltage across said second synchronous rectifier is kept substantially constant and said second synchronous rectifier continuously conducts, thereby reducing simultaneous conduction of said first synchronous rectifier switch and said second synchronous rectifier switch.

16. The circuit according to claim 15, wherein each of said first synchronous rectifier switch, said second synchronous rectifier switch and said auxiliary switch is MOSFET switch.

17. The circuit according to claim 15, further comprising a saturated inductor connected to said secondary winding.

18. The circuit according to claim 15, wherein the positive end of said driving winding and the positive end of said primary winding have the same polarities.

19. The circuit according to claim 15, wherein said forward converter further comprises a dual switch forward converter.

* * * * *